United States Patent [19]

Gillett et al.

[11] Patent Number: 4,687,628

[45] Date of Patent: Aug. 18, 1987

[54] FLEXIBLE ROD GUIDE SUPPORT STRUCTURE FOR INNER BARREL ASSEMBLY OF PRESSURIZED WATER REACTOR

[75] Inventors: James E. Gillett, Greensburg; Daniel C. Garner, Murrysville; Donald G. Sherwood, Monroeville, all of Pa.

[73] Assignee: Westinghouse Electric Corp., Pittsburgh, Pa.

[21] Appl. No.: 923,059

[22] Filed: Oct. 24, 1986

Related U.S. Application Data

[63] Continuation of Ser. No. 798,220, Nov. 14, 1985, abandoned.

[51] Int. Cl.$^4$ .............................................. G21C 19/28
[52] U.S. Cl. ........................................ 376/353; 376/335; 376/461
[58] Field of Search ............... 376/353, 335, 239, 461

[56] References Cited

U.S. PATENT DOCUMENTS

| | | | |
|---|---|---|---|
| 4,269,661 | 5/1981 | Kmonk | 376/353 |
| 4,534,933 | 8/1985 | Gjertsen | 376/353 |
| 4,597,935 | 7/1986 | Verdeau | 376/353 |

Primary Examiner—Donald P. Walsh
Attorney, Agent, or Firm—Daniel C. Abeles

[57] ABSTRACT

The inner barrel assembly of a pressurized water reactor includes an array of interleaved first and second matrices of respective first and second pluralities of rod guides of corresponding first and second different types, disposed in parallel axial relationship, the bottom ends of the guides being affixed to the top core plate of a lower barrel assembly. A flexible support structure connects the top ends of the rod guides to a lower calandria plate and particularly includes corresponding first and second pluralities of top support plates respectively connected to the rod guides of the first and second different types and having outer peripheries generally corresponding to the respective first and second types of rod guides and inner openings for permitting axial passage therethrough of corresponding, first and second different types of rod clusters. The respective top support plates of the first and second different types have mating, respective exterior and interior vertices for assemblage of same in an array of interdigitated, respective matrices. A flexible linkage is connected between each top plate of the first type and the respective surrounding and contiguous, interdigitated top plates of the second type, thereby interconnecting all of the top plates of the array in a concatenated arrangement. Stop pins received in aligned bores and extending between the interdigitized top plates limit the extent of load that can be applied to the linkage, and the ultimate extent of possible relative movement therebetween. Central recesses in top plates of the second type receive extensions from the lower calandria plate which establish basic alignment of the concatenated and interleaved matrices of top plates. Leaf springs secured to the calandria bottom plate engage and exert a downward force, at their outer ends, on the surfaces of the top plates of the second type for establishing a frictional force opposing lateral movement of the top plates of the second type and, correspondingly, through the concatenated and interleaved arrangement, the top plates of the first type, thereby opposing lateral movement while permitting restrained axial displacement of the individual rod guides.

32 Claims, 12 Drawing Figures

FLEXIBLE ROD GUIDE SUPPORT STRUCTURE FOR INNER BARREL ASSEMBLY OF PRESSURIZED WATER REACTOR

This application is a continuation, of application Ser. No. 06/798,220 filed Nov. 14, 1985 now abandoned.

BACKGROUND OF THE INVENTION

1. Field of the Invention

This invention relates to pressurized water reactors and, more particularly, to a flexible support for the rod guides positioned within the inner barrel assembly of a pressurized water reactor.

2. State of the Prior Art

Certain advanced designs of nuclear reactors incorporate at successively higher, axially aligned elevations within the reactor vessel, a lower barrel assembly, an inner barrel assembly, and a calandria, each of generally cylindrical configuration, and an upper closure dome. The lower barrel assembly may be conventional, having mounted therein, in parallel axial relationship, a plurality of fuel rod assemblies which are supported at the lower and upper ends thereof, respectively, by corresponding lower and upper core plates. Within the inner barrel assembly there is provided a large number of rod guides disposed in closely spaced relationship, in an array extending substantially throughout the cross-sectional area of the inner barrel assembly. The rod guides are of first and second types, respectively housing therewithin reactor control rod clusters (RCC) and water displacer rodlet clusters (WDRC); these clusters, as received within their respectively associated guides, generally are aligned with the fuel rod assemblies.

The calandria includes a lower calandria plate and an upper calandria plate. The rod guides are secured in position at the lower and upper ends thereof respectively, to the upper core plate and the lower calandria plate. Within the calandria and extending between the lower and upper plates thereof is mounted a plurality of calandria tubes in parallel axial relationship and respectively aligned with the rod guides. A number of flow holes are provided in remaining portions of the calandria plates, intermediate the calandria tubes, through which passes the the reactor core outlet flow as it exits from its passage through the inner barrel assembly.

In similar parallel axial and aligned relationship, the calandria tubes are joined to corresponding flow shrouds which extend to a predetermined elevation within the dome, and which in turn are connected to corresponding head extensions which pass through the structural wall of the dome and carry, on their free ends at the exterior of and vertically above the dome, corresponding adjustment mechanisms. The adjustment mechanisms have corresponding control lines which extend through the respective head extensions, flow shrouds, and calandria tubes and are connected to the respectively associated clusters of RCC rods and WDRC rods, and serve to adjust their elevational positions within the inner barrel assembly and, particularly, the level to which same are lowered into the lower barrel assembly and thus into association with the fuel rod assemblies therein, thereby to control the activity within the core.

A critical design criterion of such reactors is to minimize wear of the rodlets at interfaces between the individual rodlets of a given cluster and known support plate structures within the rod guide through which the rodlets pass for support, and thus to reduce or eliminate the factors which produce wear, such as flow induced vibration and associated vibration of reactor internal structures. Because of the relatively dense packing of the rod guides within the inner barrel assembly, it is critical to maintain substantially uniform distribution of the outlet flow from the reactor core, and an axial direction of that flow through the upper barrel assembly. Even if a uniform, axial flow of the core outlet is achieved, the effects of differential pressure and temperature across the array of rod guides, or an individual rod guide, can produce significant reaction loads at the support points, or support connections, for the rod guides. These reactor loads, coupled with the flow induced vibrating create a high potential for wear of the rod guides, as well as the rodlets. Additionally, the provision of the calandria, and particularly the lower plate thereof, presents an interface with the top end of the rod guides which does not exist in conventional pressurized water reactors. That interface must be capable of accommodating differential thermal expansions between the lower calandria plate and the inner barrel in order to prevent large thermal stresses from developing. Furthermore, the bottom calandria plate and the upper core plate are essentially structurally independent; therefore, vibration of the internals can result in significant relative movement between the supporting connections of the rod guides at their lower and upper ends respectively to the upper core plate and the bottom calandria plate. The wear potential under these circumstances is great.

Thus, split pin connections of conventional types are inappropriate for use as the supporting connections for the top ends of the rod guides since they would wear rapidly, with the result that the top ends of the rod guides would become loose. Rod guides having such loose top end connections are unacceptable because of the rapid rate of wear of the rodlets which would result. Other known mounting devices as well are inappropriate. For example, leaf springs cannot be used to support all of the rod guides because sufficient space is not available within the inner barrel assembly to provide leaf springs of the proper size for the large number of rod guides which are present, even if high strength material is used for the leaf springs.

Beyond the unsuitability of existing, known structural support arrangements, further factors must be taken into account in the consideration of possible designs for the support of the top end of the rod guides within the inner barrel assembly. For example, both the RCC and the WDRC rod clusters should be removable without requiring that the guides be disassembled. This requirement imposes a severe space limitation in view of the dense packing of the guides and their associated rod clusters within the inner barrel assembly. For example, in one such reactor design, over 2,800 rods are mounted in 185 clusters, the latter being received within a corresponding 185 guides. The space limitation is further compounded by the requirement that unipeded flow holes must be provided in the calandria plates for the core outlet flow. While these foregoing factors severly restrict the available space envelope in the horizontal cross-sectional dimension of the inner barrel assembly, axial or vertical limitations on this space envelope must also be considered. For example, the presence of the support members should not require any increase in the height of the vessel. From a maintenance standpoint, the support members should be visible for inspection and replaceable without undue effort. Additionally, the assembly load of the calandria must be less than its dead weight and must be accomplished without access to the support region. This avoids having to apply force to the calandria before installing the vessel head.

While the supports for the rod guides must therefore satisfy a wide range of structural and functional requirements relating to, or imposed by, the inner barrel assembly itself, a further critical requirement is that the wear potential of the support structure itself must be minimized. This is a critical requirement in view of the potential for intense vibration arising out of the core outlet flow and the development of high contact forces due to differential pressure and both steady state and transient temperature conditions across both the array of rod guides and the individual rod guides.

Conventional reactor designs do not present the support problems attendant the dense packing of rod guides and associated rod clusters in advanced reactor designs of the type herein contemplated. Thus, there is no known solution to the problems of adequately supporting the rod guides, consistent with the requirements and taking into account the environmental factors which exist in operation of such reactors as hereinabove set forth.

SUMMARY OF THE INVENTION

A pressurized water nuclear reactor, of the type with which the flexible rod guide support structures of the present invention are intended for use, employs a large number of reactor control rods, or rodlets, typically arranged in what are termed reactor control rod clusters (RCC) and, additionally, a large number of water displacer rods, or rodlets, similarly arranged in water displacer rod clusters (WDRC). For example, in one such reactor, an array of 185 such clusters containing a total of 2800 rodlets (i.e., the total of reactor control rods and water displacer rods) are mounted in parallel axial relationship within the inner barrel assembly. Each of these clusters, moreover, is received within a corresponding rod guide structure. In operation, it is desired to maintain the core outlet flow in an axial flow condition and in a substantially uniform distribution throughout the cross-sectional area of the inner barrel assembly, as it passes through the inner barrel assembly, and thus to prevent cross-flow conditions (i.e., core flow in a direction transverse of the rod guides). This is a critical requirement in reactors of such advanced designs in which the inner barrel is densely loaded with rodlets, as before noted.

The geometry of the reactor vessel itself introduces a structural anomaly which is contrary to maintaining the desired, substantially uniform axial flow condition. Particularly, the circular configuration of the reactor vessel, including the inner barrel assembly, is geometrically incompatible with the generally rectangular or square cross-sectional configuration of the individual rod guides, and correspondingly of an array thereof as stacked in closely adjacent relationship within the inner barrel assembly. Thus, in the peripheral regions between the inside diameter of the cylindrical inner barrel assembly and the outer periphery of the array of rod guides, no rodlets are present, resulting in a nonuniform flow distribution and presenting at least the potential of turbulence and cross-flow conditions with attendant problems of vibration. A related application of a common one of the co-inventors herein, entitled "Modular Former For Inner Barrel Assembly Of Pressurized Water Reactoring", filed concurrently herewith and assigned to the common assignee hereof, discloses an invention relating to modular formers which are configured to be mounted in these peripheral regions, to provide hydraulic resistance and thereby to maintain a primarily axial direction, and substantially uniform distribution, of the core outlet flow, throughout the length of the rod guides within the inner barrel assembly.

Thus while the state of the art, in the design of the inner barrel assembly of such advanced types of pressurized water reactors, has addressed the problem of attempting to maintain relatively stable conditions by minimizing cross-flow, e.g. by maintaining substantially uniform distribution and axial direction of the core output flow throughout the inner barrel assembly, there remains the critical problem of properly supporting the rod guides within the inner barrel because of remaining excitation forces from internal vibration and axial flow turbulence, consistent with the objectives and the structural and operating conditions and parameters as hereinabove set forth.

The present invention solves these mounting requirements for the top end supports of the rod guides and achieves the aforestated objectives through the provision of flexible rod guide support structures. Particularly, the flexible support structures for the top ends of the rod guides, in accordance with the present invention, comprise, as major components, interdigitized matrices of top plates for the rod guides, flexible linkages which interconnect the top plates in a concatenated arrangement, pin stops between the continuous top plates of the two matrices, mounting extensions from the calandria which engage the top plates of one matrix, and rod guide leaf springs which are mounted on the calandria and which exert a force against the top plates of the one matrix to restrain lateral movement. These components are configured in a pattern that is repeated across the interface between the tops of all the rod guides in the array and the bottom plate of the calandria. In a preferred embodiment, the flexible linkages are generally of square configuration, each being attached at four places to its respective WDRC guide top plate. Further, each such flexible linkage is attached to each of the four contiguous, surrounding, RCC guide top plates, at four corresponding, individual connections or attachment points. Thus, each WDRC guide is attached, or concatenated, laterally to the four surrounding RCC rod guides via the flexible linkage. This concatenated assembly of linkages creates a stiff structure between the guides in a plane perpendicular to the axis of the rod guides. Thus, the guides are essentially bound together laterally; however, the linkages in the out-of-plane direction, i.e., axially, are flexible and thus accommodate relative axial motion between guides to permit bowing of adjacent guides. This capability of flexibility in one plane must be provided to compensate for local differences in height of adjacent guides due to differential thermal expansion and bowing due to pressure differential across the guide. Thus, the flexible linkages in accordance with the invention will be understood to be flexible in a direction parallel to the axis of the rod guide, but rigid in a plane perpendicular to the axis of the rod guide. It will also be understood that the assemblage of linkages in the concatenated arrangement as well are rigid in the plane perpendicular to the parallel axes of the array of rod guides. Absent this flexibility of the linkages, the linkages would be overstressed and would fail. Further, the flexible linkages are recessed into the top plates to prevent damage during assembly.

Lateral loads exerted on the rod guides are reacted into the calandria either by the calandria extensions or by the leaf springs, at each of the RCC plates. The rod guide leaf springs, as mounted on the calandria plate and pressed against the RCC top plates, generate sufficient lateral frictional force such that fluctuating steady state loads exerted on the guides do not cause slippage. Moreover, the mounting extensions from the calandria provide overall lateral support during events such as seismic, which can exceed the lateral frictional force of the leaf springs, and provide alignment between the rod guides and the calandria, there being one extension for each of the RCC guides. Collectively, the calandria extensions react the seismic loads from the rod guides. Alignment of the RCC clusters in the rod guide top plates further is controlled by the calandria extensions.

The pin stops are located on the top of the WDRC guides and mate with openings provided therefor in the associated four, adjacent RCC guides. The pin stops serve three purposes. First, during assembly of the guides, the pin stops provide rough positioning of adjacent rod guides prior to attachment of the square flexes. Secondly, the pin stops limit the amount of deflection possible along the axis of the flexible linkage, and thereby prevent excessive stress of any individual element due to an unanticipated and transient conditions. Finally, the pin stops provide an ultimate load capacity for very large loads. Essentially, the pin stops have a greater load capability than that of the WDRC guide itself. Proper selection of the material for the pin stop enables the attachment between adjacent guides to have the same or greater lateral load capacity than the rod guide enclosures. This provides a balanced design where the method of attachment of the rod guide is not structurally limiting. By this configuration and arrangement, the rod guide flex support of the invention virtually totally assures that loads on the WDRC rod guides can be transmitted through the RCC rod guide top plates and into the calandria.

Thus, normal operational fluctuating loads are reacted laterally by the frictional forces generated by the leaf springs attached to the calandria and which press onto the tops of the RCC guides. The flexible linkages, moreover, transmit loads from the WDRC guide top plates to the adjacent RCC guide top plates; as a result of this design, impact between the rod guide top plates and the calandria extensions are essentially precluded. A further major advantage of the combined flexible linkage support and leaf spring frictional support is that wear or gap size between the calandria and the rod guides can be virtually ignored due to the continuing ability of the leaf springs to react lateral force components on the rod guides, even in the event of wear of the calandria extensions, and thus to suppress top end lateral motion and correspondingly prevent any increase in the excitation of the rodlets. This assures that rodlet wear does not increase, despite the potential of slippage due to inadvertent wear of the rod guide support, the need for significant gaps to permit assembly, and resultant increased tolerances between adjoining parts. Further, the concatenated interconnections of the flexible linkages distribute loads between adjacent extensions. Additionally, because of the coupled effect of the flexible linkages and the leaf springs, axial core plate vibration and resulting wear are of reduced concern since the leaf springs increase by more than an order of magnitude the allowable wear depth on the calandria extension before alignment between the rodlet clusters and respective rod guides is compromised. Further, regardless of the gap size between the calandria extension and the respective rod guide top plate, the lateral excitation of rodlets within the respective rod guides is not affected.

These and other advantages of the flexible rod guide support for the inner barrel assembly of a pressurized water reactor in accordance with the present invention will become more apparent from the following detailed description and drawings.

DETAILED DESCRIPTION OF THE PREFERRED EMBODIMENTS

Figure 1:
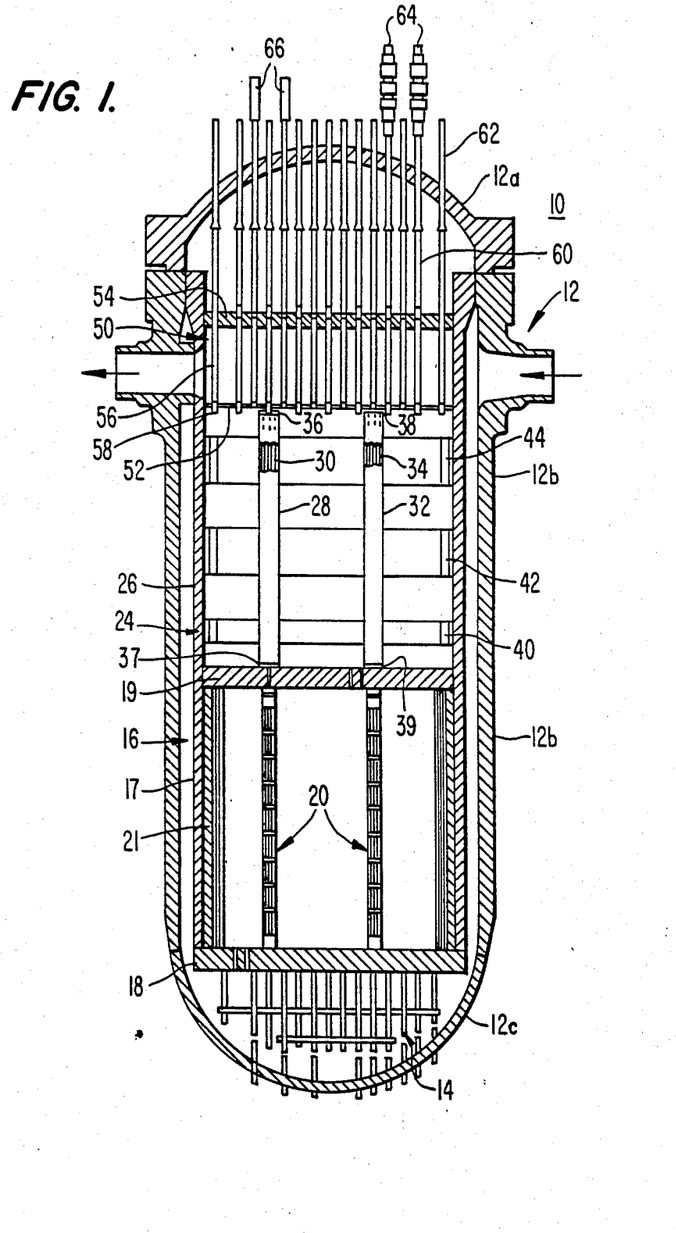
FIG. 1 is an elevational view, partially in cross-section, of a pressurized water reactor of a type with which the flexible rod guide supports of the present invention are intended to be employed.

FIG. 1 is an elevational view, partly in cross-section, of a pressurized water reactor 10 comprising a vessel 12 of generally conventional configuration including an upper dome 12a, cylindrical sidewalls 12b, and a bottom closure 12c comprising the base of the reactor 10. Within the bottom closure 12c, as schematically indicated, is so-called base-mounted instrumentation 14. The lower barrel assembly 16 comprises a generally cylindrical sidewall 17 affixed at its lower and upper ends to respective lower and upper core plates 18 and 19. Fuel rod assemblies 20 are positioned in generally vertically oriented, parallel axial relationship within the lower barrel assembly 16. A radiation reflection shield 21 is mounted interiorly of the cylindrical sidewalls 17, in conventional fashion.

The inner barrel assembly 24 includes a cylindrical sidewall 26 within which are positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guide 32 housing a cluster of water displacement rods 34 (WDRC). Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50.

The calandria assembly 50 includes a lower calandria plate 52, an upper calandria plate 54, and a plurality of parallel axial calandria tubes 56 which are positioned in alignment with corresponding apertures in the lower and upper calandria plates 52 and 54 and to which the calandria tubes 56 are mounted at their respective, opposite ends. Calandria extensions 58 project downwardly from the calandria tubes 56 and connect to corresponding mounting means 36 for the upper ends, or tops, of the RCC rod guides 28. The upper end mounting means 38 associated with the WDRC rod guides 32, in accordance with the present invention, are interconnected by flexible linkages (shown and described in detail hereafter) to the the mounting means 36 of the RCC rod guides 28. Thus, the calandria extensions 58 are associated only with the RCC rod guides 28 and not with the WDRC rod guides 32 but serve, through the flexible linkages, to provide both stiff lateral as well as resilient axial support to compensate for relative differences in positioning to the tops of the WDRC rod guides 38 without overstressing the flexible linkages.

Extending upwardly beyond the upper calandria plate 54 and, more particularly, within the dome 12a of the vessel 12, there is provided a plurality of flow shrouds 60 respectively aligned with the calandria tubes 56. A corresponding plurality of head extensions 62 is aligned with the plurality of flow shrouds 60, with respective adjacent ends thereof in generally overlapping relationship. Control rod cluster (RCC) displacement mechanisms 64 and water displacement rod cluster (WDRC) displacement mechanisms 66 are associated with the respective head extensions 62, flow shrouds 60 and calandria tubes 56 which, in turn, are respectively associated with the respective clusters of radiation control rods 30 and water displacment rods 34. Particularly, the RCC and WDRC displacement mechanisms 64 and 66 connect through corresponding lines to the respective clusters of radiation control rods and water displacement rods 30 and 34, to control the respective vertical positions thereof and, particularly, to selectively lower same through corresponding openings (not shown) provided therefore in the upper core plate 19 into surrounding relationship with respectively associated fuel rod assemblies 20. In this regard, the clusters 30 and 34 have an extend of travel corresponding substantially to the longitudinal, oraxial height of the fuel rod assemblies 20. While the particular control function is not relevant to the present invention, insofar as the control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into the core and with the effective water displacement adjustment which is achieved by selective positioning of the water displacement rods 34.

Figure 2:
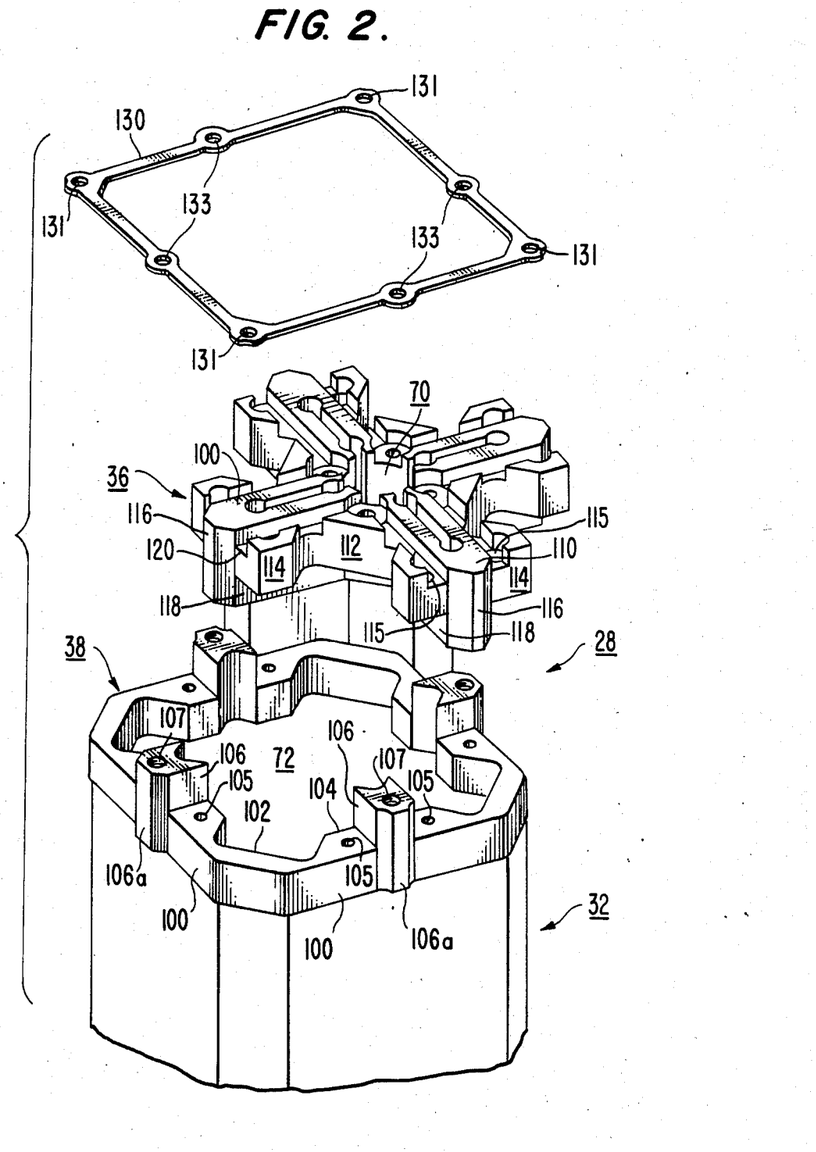
FIG. 2 is a perspective, exploded and partially broken-away, simplified view of RCC and WDRC top plates with associated guide structures and a flexible linkage for interconnecting same, in accordance with a first embodiment of the invention.
Figure 3:
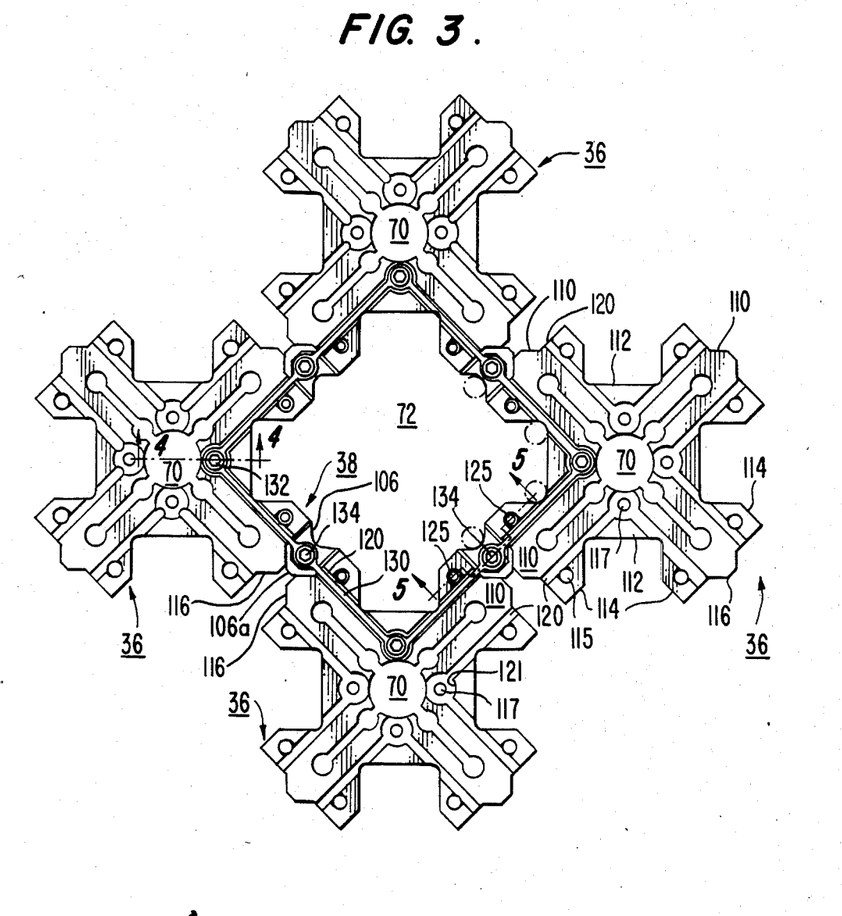
FIG. 3 is a top plan view of the elements of FIG. 2, as assembled.
Figure 4:
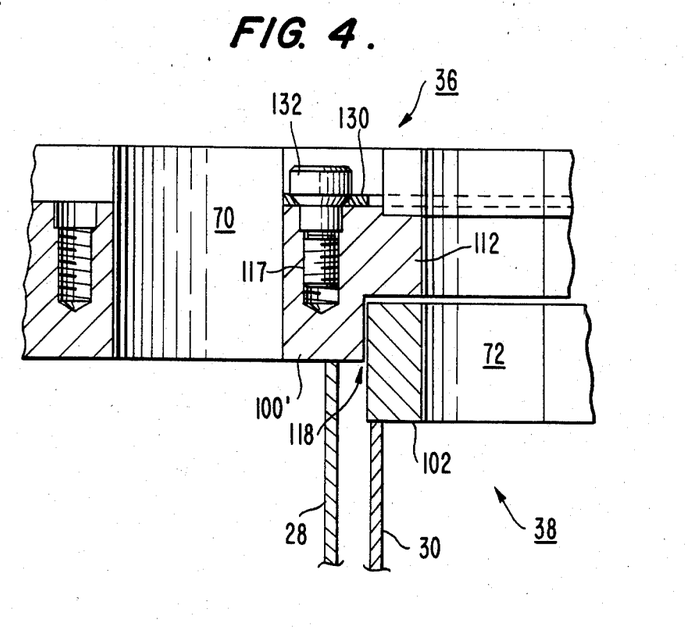
FIG. 4 is an elevational cross-sectional view taken along the line 4—4 in FIG. 3.
Figure 5:
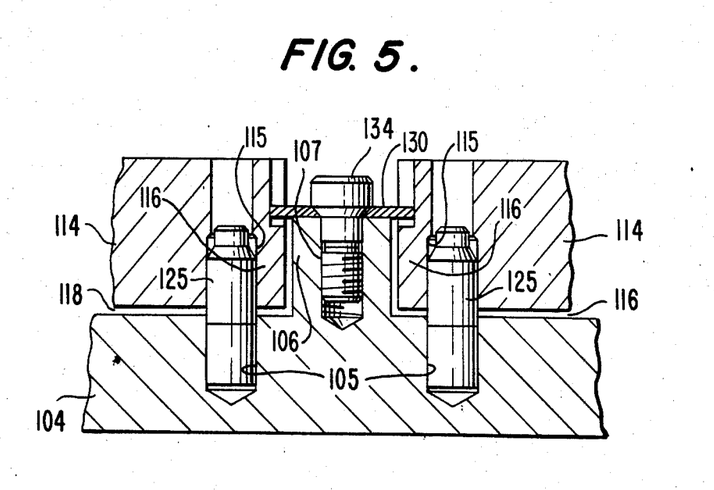
FIG. 5 is an elevational, cross-sectional view taken along the line 5—5 in FIG. 3.

The flexible rod guide support for the inner barrel assembly of a pressurized water reactor in accordance with the invention will be discussed with concurrent reference to FIGS. 2-5, inclusive. FIG. 2 comprises a perspective, exploded and partially broken away view of rod guides and respectively associated top plates, in conjunction with a flexible linkage in accordance with a first embodiment of the present invention. FIG. 3 comprising a top plan view of an exemplary assemblage of a top plate of a first (WDRC) type, as interdigitized with associated top plates of a second (RCC) type disposed in surrounding, mating relationship therewith and, further, as interconnected by a flexible linkage, all in accordance with the aforesaid first embodiment of the invention. FIGS. 4 and 5 comprise elevational, cross-sectional views taken along the lines 4—4 and 5—5, respectively, in FIG. 3.

The rod guide 32 for the WDRC rod cluster 34 and the rod guide 28 for the RCC rod cluster 30, as best seen in FIG. 2, have first and second, different configurations, and have respectively associated therewith top plates 38 and 36 corresponding to the respective mounting means 38 and 36 diagramatically illustrated in FIG. 1. Each of the rod guides 28 and 30 is formed of sheet metal and each of the respective top plates 36 and 38 is machined to achieve the configurations as illustrated. The peripheries of the top plates 36 and 38 generally correspond to the peripheries of the respective rod guides 28 and 30, as viewed in cross-section taken in a plane transverse to the vertical axes thereof and thus parallel to the plane of FIG. 3. The top plates 36 and 38 furthermore have interior channels 70 and 72, respectively, the profiles or boundaries of which correspond to the configuration, again in cross-section, of the corresponding RCC rod clusters 30 and WDRC rod clusters 34, the latter being illustrated in simplified schematic form in FIGS. 6 and 7, respectively.

Figure 6:
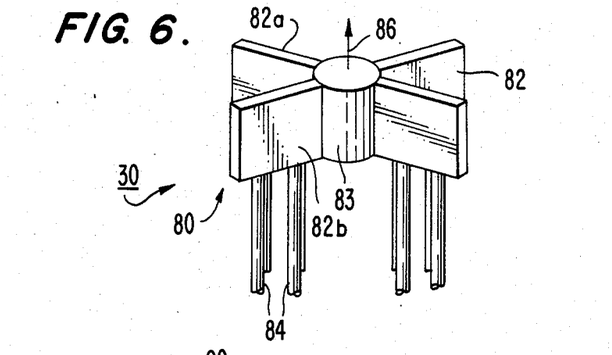
FIG. 6 is a simplified, perspective view of an RCC rod cluster and associated supporting spider and drive line.

In FIG. 6, the RCC rod cluster 80, shown in a simplified perspective view, includes a spider 82 comprising a pair of orthogonally related cross arms 82a and 82b interconnected by a central hub 83, a plurality of RCC rodlets or rods 84 depending from the arms 82a and 82b. Particularly, each of the arms 82a and 82b carries four (4) such rods 84. Correspondingly, as best seen in FIG. 3, the interior channel 70 of the top plate 36 has a profile corresponding to the RCC rod cluster 30, permitting the latter to be lowered axially through the channel 70 thereof under control of the control rod displacement mechanism 64 (FIG. 1) which connects through drive line 86 to the central hub 83 of spider 82 of the RCC rod cluster 30.

Figure 7:
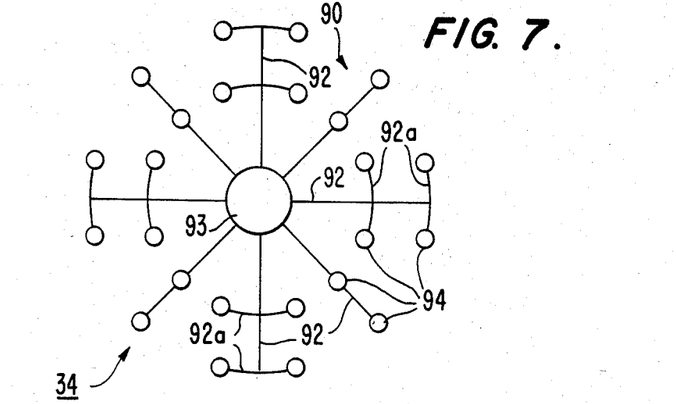
FIG. 7 is a simplified, plan view of a WDRC rod cluster and associated spider.

The interior channel 72 of the WDRC top plate 38 likewise has a profile corresponding to the periphery, again in cross-section, of the WDRC rod cluster 34 (FIG. 1), the latter being shown in a simplified schematic plan view in FIG. 7. The WDRC rod cluster 34 similarly includes a spider 90 having a plurality of radially extending arms 92 connected to a central hub 93; further, alternate ones of the arms 92 include transverse cross arms 92a. A plurality of WDRC rods 94 then are appropriately connected to the arms 92a and depend therefrom in parallel axial relationship.

From FIG. 3, it will be apparent that the respective rod guides 28 and 30 and the associated top plates 36 and 38 are configured so as to permit relatively dense packaging thereof and, more particularly, the assemblage thereof as interdigitized matrices. Particularly, the top plate 38 of the WDRC rod guides 30 is surrounded by a symmetrical, associated sub-array of four RCC top plates 36; further, each of the RCC top plates 36 in turn is configured to engage an associated sub-array of four WDRC top plates 38. While the symmetrical configuration of the respective rod clusters and thus of the corresponding rod guides and associated top plates is a preferred embodiment, alternative configurations are also contemplated as within the scope of the invention, the principal requirement being that interdigitized matrices of the respective rod guides and top plates may be established in a tightly packaged array. The top plates 36 and 38 are now described in detail, with concurrent reference to FIGS. 2-5, common reference numerals being employed to identify the common elements of the symmetrical portions of the respective, individual structures.

The WDRC top 38 plate is of a generally annular configuration with a generally square periphery and includes four (4) major arms 100, each each pair of two (2) adjacent arms 100 extending in perpendicular relationship and the totality of four (4) such pairs defining four (4) major exterior vertices, or corners. A diagonal minor arm 102 spans each such vertex and integrally interconnects the pair of associated, adjacent major arms 100. Inwardly transverse, or lateral, extensions 104 are formed at intermediate positions along the length of each of the major arms 100 displaced from the opposite ends thereof, and integrally join a central, link connection vertical stub 106. An outwardly transverse, or lateral wedge-fit extension 106a is formed on the stub 106, extending beyond the outer sidewall surface, or periphery, of the major arm 100. A link connection threaded bore 107 is formed in each vertical stub 106.

The RCC top plate 36 (best seen in FIG. 3) includes a corresponding plurality of four (4) equiangularly displaced major arms 110, the interior peripheral edges of each pair of adjacent arms 110 defining an interior vertex which receives therein a corresponding exterior vertex, or corner, of the top plate 38, as defined by a pair of adjacent major arms 100 thereof. The top plate 36 further includes a diagonal minor arm 112 extending across the geometrical interior vertex defined by the major arms 110, the exterior vertical surface of the arm 112 corresponding to the interior vertical surface of the diagonal minor arm 102 of the top plate 38. Transverse, or lateral extensions 114 extend symmetrically from both sides of the major arms 110, each extension 114 corresponding in size and configuration to the corresponding lateral extension 104 of a top plate 38 associated with the corresponding arm 100. As best seen in FIG. 2, the transverse lateral extensions 114 on the respective peripheral edges of a pair of adjacent major arms 110 which define a given interior vertex are continuous with the diagonal minor arm 112, and furthermore the extensions 114 and the included diagonal minor arm 112 have a common planar upper surface, corresponding to the planar upper surface of the major arms 110, but are forshortened in vertical height relative to that of the major arms 110 such that the lower surfaces thereof define an undercut interior peripheral region, or channel, 118.

The outer end of each major arm 110 furthermore includes a wedge-fit extension 116 generally aligned with the major axis of the corresponding major arm 110. A stop pin bore 115 is formed in each of the transverse lateral extensions 114 of each arm 110 in a position so as to be aligned with the stop pin bore 105 in the corresponding inward lateral extension 104 of a corresponding arm 100 when the top plates 36 and 38 are assembled, as in FIG. 3. Further, a link connection threaded bore 117 is formed in the integral juncture 110' of adjacent major arms 110 surrounding the interior channel 70 and defining the interior vertex. A groove 120 further is formed in the associated transverse extensions 114 and the included diagonal minor arm 112, extending along the respectively associated peripheral edges of the associated pair of adjacent major arms 110 and communicating with a counter bore 121 which is coaxial with the threaded bore 117.

The assembled relationship of the top plates 36 and 38 is best understood from the top plan view of FIG. 3, taken in conjunction with the vertical cross-sectional views of FIGS. 4 and 5, the latter taken along the lines 4—4 and 5—5 in FIG. 3, respectively. As seen in FIG. 4, each diagonal minor arm 102 of the top plate 38 is received within the corresponding diagonal portion of the channel 118 defined by the diagonal minor arm 112 and the integral juncture 110' of an adjacent pair of major arms 110, the diagonal minor arm 112 thus being superposed on diagonal minor arm 102. As seen in FIG. 5, the transverse lateral extensions 114 are superposed on the respective midside, inward lateral extensions 104 of a given major arm 100 of the top plate 38. As best seen from FIG. 3, the free ends of the major arms 110 of two adjacent top plates 36 which bound, or are contiguous with, a common major arm 100 of a top plate 38 are juxtaposed in closely spaced relationship, the respective, aligned wedgefit extensions 116 thereof closely engaging the respective surfaces of the corresponding outward, transverse wedge-fit extension 106a of that associated major arm 100. Stop pins 125 then are positioned in the aligned stop pin bores 105 and 115.

Finally, a flexible linkage 130 is received within the channels 120 of the group of top plates surrounding a given top plate 38, which then is bolted in position. Particularly, bolts 132 are received through the apertures 131 in the corners, or vertices, of the linkage 130 and securely threaded into the corresponding, threaded bores 117 and, further, bolts 134 are received through the apertures 133 in the side arms of the linkage 130 and securely threaded into the corresponding threaded bores 107 in the link connector vertical stubs 106.

Respective matrices of top plates 36 and 38 thus are interdigitized by virtue of the respective structural components defining the mating, interior and exterior vertices thereof and including the channels 118 and the superposed lateral, or transverse, extensions 114 and 104. Further, the top plates are laterally interlocked (i.e., in a plane perpendicular to the axis of the assembly 24) by the flexible linkages 130 in a two dimensional, concatenated relationship in which each of the top plates 38 is linked rigidly in the lateral direction to four respectively surrounding top plates 36—and, in turn, each of the top plates 36 is laterally interlocked at its four interior vertices to associated exterior vertices of four top plates 38 which are interdigitized therewith. It will be appreciated that whereas the interdigitized relationship exists throughout the majority of the array, as is apparent, the outer edges, or the periphery, of the array necessarily will be defined by one or more peripheral edges of either one or the other of the top plates 36 and 38—typically, the top plates 36.

Figure 8:
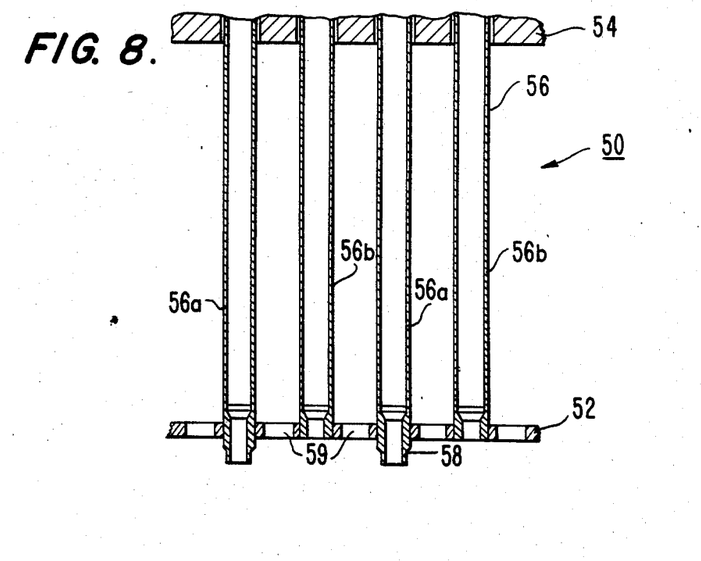
FIG. 8 is an elevational, cross-sectional view of a portion of the calandria plate and associated calandria extensions as seen in FIG. 1, on an enlarged scale.

Mounting of the concatenated and interdigitized matrices of top plates 36 and 38, for securing the top ends of the rod guides 28 and 30 in position within the upper end of the inner barrel assembly 24, is achieved by connections provided between the lower calandria plate 52 and the RCC top plates 36. FIG. 8 is an enlarged view of the portion of a lower calandria plate 52 and of a broken-away portion of the upper calandria plate 54, illustrating more clearly the association of the calandria tubes 56 and the calandria plates 52 and 54. More specifically, the calandria tubes 56a which are connected at their lower ends to corresponding calandria extensions 58 are associated with the RCC rod clusters and the associated top plates 36. Calandria tubes 56b, on the other hand, are associated with the WDRC rod clusters and the corresponding top plates 38. Provided in the lower calandria plates 52, intermediate the various calandria tubes 56, are flow holes 59 through which the core output flow, exiting upwardly from the inner barrel assembly 24, proceeds through the calandria assembly 50. Corresponding flow holes (not shown) are provided in the upper calandria plate 54.

Figure 9:
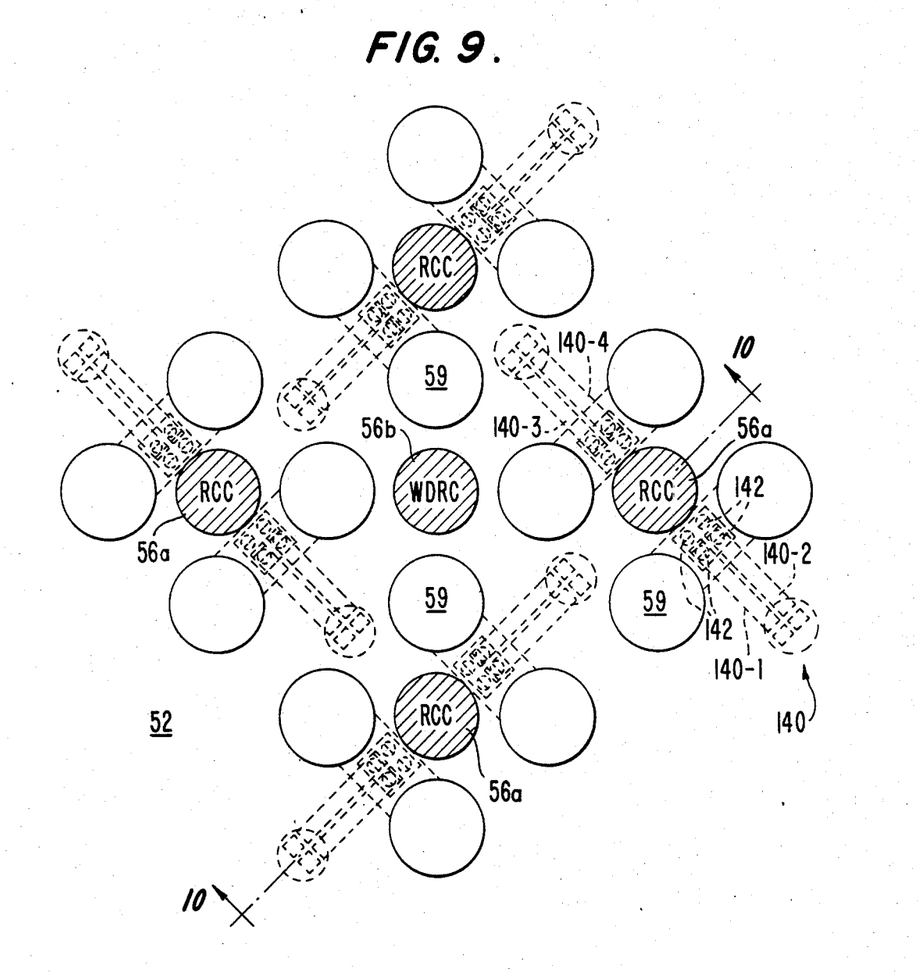
FIG. 9 is a schematic, top plan view of a portion of the lower calandria plate of FIG. 1, illustrating the relationship of RCC and WDRC rod guides and, in hidden lines, the leaf springs and their relative orientations.
Figure 10:
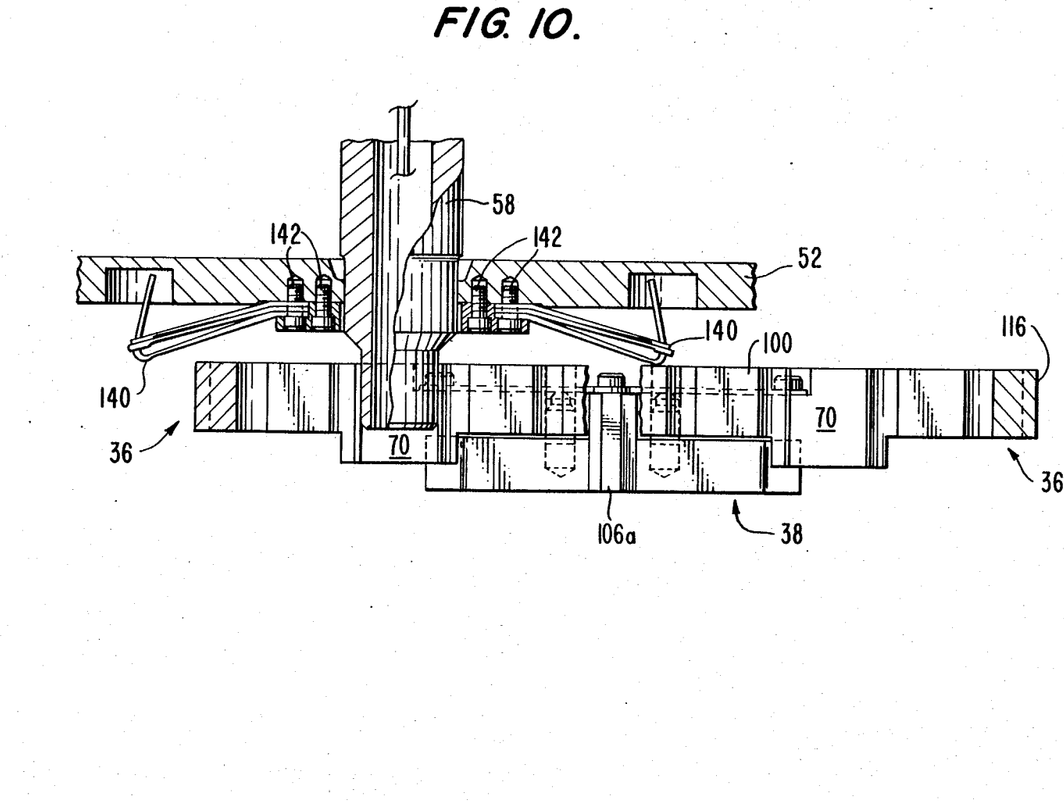
FIG. 10 is an elevational, cross-sectional view taken generally along the line 10—10 in FIG. 9, illustrating the association of the assembled RCC and WDRC top plates with the calandria extensions and the leaf spring engagement therewith, in accordance with the invention.

FIG. 9 is a top plan view of a portion of the lower calandria plate 52, illustrating (in solid cross-section) the assemblage of calandria tubes 56a and 56b associated with the array of top plates 36 and 38 shown in FIG. 3. FIG. 10 is a cross-sectional view illustrating the connection of a top plate 36 to the calandria bottom plate 52 by a calandria extension 58. Particularly, the calandria extension 58, of circular cross-section, is received within the corresponding circular cross-sectional channel 70 of an RCC top plate 36, thus establishing lateral stability of the RCC top plate 36; each top plate 36 receives a corresponding calandria extension 58 in its channel 70. Accordingly, the RCC top plates 36 are supported directly, and the interdigitized and concatenated top plates 38 thus are supported through, the top plates 36, against lateral movement by the plurality of calandria extensions 58 and ultimately by the lower calandria plate 52.

FIGS. 9 and 10, taken concurrently, illustrate leaf springs 140 which resiliently load the top surfaces of the top plates 36 of the RCC rod guides 28, and which generate sufficient lateral frictional force such that fluctuating steady state loads applied to the guides do not cause slippage; the springs 140 also compensate for effects of differential thermal expansion and minimize adverse effects of resulting forces due to such thermal expansions. More particularly, the leaf springs 140 are attached to the lower surface of the lower calandria plate 52 by suitable bolts 142; as seen better in FIG. 9, the leaf springs 140 comprise two parallel pairs 140-1, 140-2 and 140-3, 140-4, for a total of four (4) springs, the first pair of springs 140-1 and 140-2 being aligned with the second pair of springs 140-3 and 140-4 and thus displaced from one another by 180° about the generally circular cross-section of the RCC calandria tube 56a. Moreover, with respect to the matrix of RCC top plates 36 and the corresponding RCC calandria tubes 56a, the leaf springs 140 are rotated by 90° for successive RCC calandria tubes 56a of a given row, the leaf springs 140 for the respective, column-related calandria tubes 56a of successive, adjacent parallel rows being offset by 90°.

From FIG. 10, the two related pairs of leaf springs 140 extending from a given calandria extension 58 associated with a given top plate 36, at their outer free ends, engage the corresponding end extremities of the upper surfaces of the adjacent, aligned major arms 100 of the aligned and next adjacent RCC top plates 36 (only one of which is shown) at corresponding positions close to the outer, free ends thereof. Further, due to the symmetrical and regular array of calandria tubes 56 and associated extensions 58 with respect to the top plate 36 and the alternating parallel and transverse orientation of the leaf springs 140, it will be apparent that each top plate 36 is engaged by a symmetrically loaded force by corresponding leaf springs at the outer extremities of the aligned, or 180° displaced, major arms 100 so as to maintain a symmetrical or balanced loading force thereon.

The requirements which must be satisfied by the flexible rod guide support structure of the invention, as outlined briefly above, the adverse environmental conditions (e.g., vibration, and both axial and lateral displacement forces) which exist within the inner barrel assembly 24 and the manner in which the flexible rod guide support structure of the present invention accommodates these conditions and satisfies those requirements, as now may be better appreciated, will be discussed, again with reference to FIG. 1. Further, as before noted, the flexible support structure of the invention must, itself, not introduce sources of vibration and most significantly must not be susceptible to excessive wear which, over time, would cause the mounting assembly to loosen and eventually permit vibrations to ensue.

Particularly, the concatenated and interdigitized matrices of the RCC top plates 36 and WDRC top plates 38 effectively present a single, relatively stiff structure of mutually, or interdependently, supported top plates at the interface of the inner barrel assembly 24 and the lower calandria plate 52, which nevertheless permits a limited extent of relative motion between the rod guides 28 and 32 by out-of-plane bending of the flexible linkages 130. The flexible support structure of the invention furthermore facilitates assembling the rod guides with the calandria extensions 58—which assembly, as before noted, is accomplished by having the RCC top plates 36 receive the calandria extensions 58 within the respective cylindrical internal channels 70 therein. The extent of relative movement between adjacent top plates 36 and 38, as permitted by in-plane tensile elongation of the flexible linkages 130, however, is limited by the stop pins 125 which provide an ultimate load capacity for very large loads. Thus, under very large loads, the stop pins 125 prevent excessive loading of any of the flexible linkages 130 and ensure that loads from the WDRC rod guides 30 are transmitted through the concatenated and interdigitized RCC top plates 36 into the calandria bottom plate 52. The stop pins 25 serve a further function in providing rough positioning of the interdigitized top plates 36 and 38 prior to attachment thereto of the flexible linkages 130.

As previously noted, the leaf springs 140 serve to react normal operational fluctuating loads laterally, by the frictional forces generated by their engagement with the top surfaces of the RCC top plates 36. The leaf springs may be of the type known as 17×17 fuel assembly springs, which are typically employed in conjunction with the fuel rod assemblies 20 in the lower barrel assembly 16. As employed in accordance with the present disclosure, the leaf springs 140 may be designed to react nominally a force of 388 lbs. at each RCC guide top plate 36, assuming a coefficient of 0.3 without slippage. More specifically, the nominal force applied to each RCC top plate 36 is 1,294 lbs. with a range of 918 lbs. to 1,528 lbs. Accordingly, assuming a coefficient of friction of 0.3, the lateral force can be nominally as great as 388 lbs. before any movement of a given top plate 36 would occur. Differential lateral forces across the array thus may be compensated for and reacted to independently by the corresponding leaf springs 140. The concatenated design particularly precludes impact wear from occurring between the rod guide top plates 36 and 38 and the calandria extensions 58. To the extent that such wear does occur, and particularly relative to the calandria extensions 58, the extent and effect of such wear is believed not significant relative to rod guide alignment or the structural capability of the extensions 58 to react to seismic loads. To the extent that wear relative to a particular extension 58 occurs, in like fashion, the associated leaf springs 140 will continue to maintain both axial and lateral alignment, and to react forces tending to cause lateral lateral displacement, thus limiting the excitation and ultimately wear on the RCC guides 34 and WDRC guides 30 and the respective rodlet clusters 92 and 84.

The concatenated relationship of the interdigitized matrices of the array affords the further significant benefits of distributing force effects via the flexible linkages and compensating for differential axial expansion and lateral forces acting on the array, throughout the entirety of the interdigitized rod guide top plates 36 and 38, and thus minimizing wear potential with respect to any given calandria extension 58 and its respectively associated top plate 36, and of the interface between any given rod guide and its associated rodlet cluster. Thus, the potential of wear due both to axial sliding forces arising, for example, from core plate vibration and as well due to lateral forces resulting from differential thermal and other effects is greatly decreased, and the structure is self-compensating even as to any specific, individual connection with a given calandria extension 58 which has worn due, for example, to initial mechanical misalignment.

As can be appreciated from FIG. 10, only minimal axial space is required to accommodate the array of top plates 36 and 38 and the flexible linkages 130 therein, along with the leaf springs 140; this enables use of the flexible rod guide support structure of the invention without requiring any modification of the vessel 10 to accommodate an axially elongated inner barrel assembly 24. As is clear from FIG. 9, taken further in the context of FIGS. 1 and 8, the flexible support structure of the invention does not interfere with the required free passage of core outlet flow through the openings 59 provided therefor in the lower calandria plate 52 (i.e., at which the support structure of the invention presents an interface, as before noted).

While it is preferred to employ a flexible linkage 130 of generally square configuration, alternative configurations are also available and fall within the scope of the invention. For example, two or more individual linkages 130 may be stacked to obtain selectively variable stiffness across the tops of the concatenated support plates. Further, it will be appreciated that each square linkage 130 comprises effectively a unitary assemblage of four individual flexible support linkages of two perpendicular arms each, namely the pair of adjacent linkage arms extending from and including a vertex having a screw hole 131, and through and including the enlarged portions containing the screw holes 133. Thus, four (4) separate linkages so configured could be employed in the alternative to a unitary linkage 130 as shown; while this would simplify manufacture, it would increase the number of parts and connectors required for assembly. The cross-section of the arms of the linkage 130, whether of unitary structure or of individual two-arm linkages as described, may be varied to achieve the desired stiffness. Moreover, rather than being symmetrical, the arms of each individual linkage, or the corresponding arms of an unitary assemblage may have an L-shape (i.e., of equal length arms) or other configuration, in accordance with the configurations of the associated top plates and the related connection positions thereon.

Figure 11:
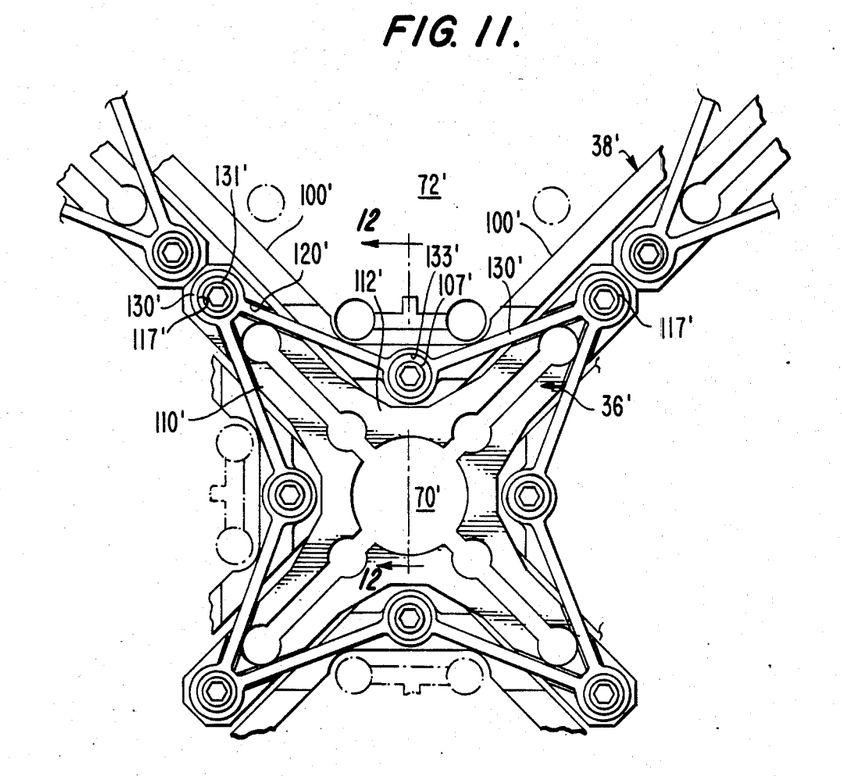
FIGS. 11 and 12 are simplified, top plan and side elevational cross-sectional views of assembled top plates and a flexible linkage interconnecting same, in accordance with a second embodiment of the invention.
Figure 12:
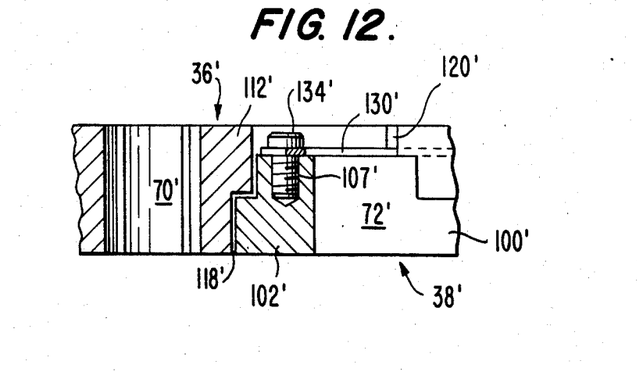

Furthermore, the linkages, while contemplated to have exterior right angle vertices as in the case of the square linkage 130, may have alternative angular vertices, for example as shown in FIGS. 11 and 12. More particularly, FIG. 11 is a schematic and somewhat simplified top plan view of an alternative arrangement of an RCC top plate 36' and a WDRC top plate 38' having an associated flexible linkage 130', FIG. 12 comprising an elevational cross-sectional view along the lins 12—12 in FIG. 11. The flexible linkage 130' is of star-shaped configuration and is connected to the respective top plates 36' and 38' in somewhat of a reverse orientation of parts, relative to the embodiment of FIGS. 2-10. Particularly, the adjacent major arms 100' of the WDRC top plate 38' again form an exterior vertex crossed by a diagonal minor arm 102' which is received by a channel 118' such that a diagonal minor arm 112' of the RCC top support 36' is superposed in part on the diagonal minor arm 102' of the WDRC top plate 38' in interdigitized relationship. The diagonal arm 102' in this instance is extended vertically relatively to the height of the major arms 100', in a manner somewhat analogous to the vertical stub extension 106 of the top plate 38 as seen in FIG. 2. A groove 120' extends downwardly through the top surface of the major arms 110' and a star-shaped flexible linkage 130' then is received within the grooves. The central aperture 133' of the linkage 130' thus is disposed in alignment with the link connection threaded bore 107' in the diagonal minor arm 102', and the corner apertures 131' of the linkage 130' are disposed in alignment with the respective link connection threaded bores 117', in this instance formed in the extremities of the major arms 110' of the RCC top plate 36'. Although for simplicity of illustration, corresponding bolts are not shown in FIG. 11, FIG. 12 illustrates a bolt 134' connecting the center aperture 133' of the flexible linkage 130' to the diagonal minor arm 102' of the WDRC top plate 38'. Similar bolts of course would connect the corner apertures of the linkage 130' to the extremities of the major arms 110' of the RCC top plate 36. Thus, each exterior vertex of the WDRC top plate 38' is received in mating engagement within an interior vertex of the RCC top plate 36', as in the first embodiment of the invention, and the same are concatenated by a flexible linkage interconnecting the major arms of one thereof with the major arms of the other, the link connection positions being reversed effectively in the embodiment of FIGS. 11 and 12, relatively to those of the first embodiment.

Accordingly, it will be apparent to those of skill in the art that numerous modifications and adaptations of the invention may be achieved and accordingly it is intended by the appended claims to cover all such modifications and adaptations as fall within the true spirit and scope of the invention.

We claim as our invention:

1. A flexible support structure for the upper ends of first and second pluralities of rod guides of respective first and second different types disposed as corresponding, interleaved first and second matrices thereof in parallel axial relationship within an inner barrel assembly of a pressurized water reactor vessel for receiving therein respective, corresponding first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly and said first and second pluralities of rod guides being disposed in parallel axial relationship in an array of interleaved, respective first and second matrices with the bottom ends thereof affixed to said first plate and the top ends thereof disposed adjacent said second plate, comprising:

a first matrix of plural top support plates of a first type disposed on and connected to the respective top ends of said first plurality of rod guides of said first type, each said top support plate of said first type comprising a unitary structure of plural arm segments in an annular configuration and having a periphery generally corresponding to the configuration of the respectively associated top end of said rod guide of said first type and an interior opening permitting axial passage therethrough of a corresponding rod cluster of said first type, said plural arm segments comprising a plurality of successive major arms having corresponding peripheries and the peripheries of successive pairs of adjacent major arms defining a plurality of corresponding exterior vertices;

a second matrix of plural top support plates of a second type disposed on and connected to the respective top ends of said second plurality of rod guides of said second type, each said top support plate of said second type comprising a unitary structure of plural arm segments having a periphery generally corresponding to the configuration of the top end of said respectively associated rod guides of said second type and an interior opening permitting axial passage therethrough of a corresponding rod cluster of said second type, said plural arm segments comprising a plurality of successive major arms having corresponding peripheries and the peripheries of successive pairs of adjacent major arms defining a plurality of corresponding interior vertices, the interior vertices of each said top plate of said second type corresponding to respective, exterior vertices of each said top plate of said first type for receiving a respective, said exterior vertex therein in mating relationship;

said first and second matrices of said top plates being assembled in interdigitated relationship with the interior vertices of said top plates of said second type within said array receiving, in mating relationship therein, respectively corresponding exterior vertices of respective, contiguous said top plates of said first type;

a linkage connecting position at each vertex of one of said first and second top plates and a linkage connecting position on each of the adjacent major arms of the pair associated with the mating vertex of the other of said first and second top plates; and a flexible linkage interconnecting each said vertex linkage connecting position of said one of said first and second top plates with said linkage connecting positions on the respective adjacent major arms associated with the mating vertex, as received therein, of the other of said first and second top plates.

2. A flexible support as recited in claim 1, further comprising:

a plurality of extensions depending from said second plate and respectively corresponding to said plurality of top plates of said second type;

each said top plate of said second type defining a central receiving aperture for receiving a corresponding said depending extension therewithin, thereby to axially align each of said top plates of said second type and the associated said rod guides of said second type within said inner barrel assembly.

3. A flexible support as recited in claim 2, wherein there is further provided a plurality of resilient means respectively associated with said top plates of said second type, each said resilient means being secured to said second plate and contacting and exerting a vertically downward force on a respectively associated top plate of said second type, thereby establishing a frictional engaging force opposing lateral displacement of each said top plate of said second type and the rod guide associated therewith from the said axially aligned position thereof.

4. A flexible support as recited in claim 3, wherein:

each top plate of said second type includes at least a pair of aligned, first and second said major arms, said pairs of aligned major arms of said plurality of top plates of said second type being disposed in alternating transverse relative relationship in both the row and column directions of said matrix thereof; and said resilient means associated with each of said top support plates of said second type comprises a pair of first and second resilient means engaging the extremities of the respective first and second major arms of said aligned pair thereof.

5. A flexible support as recited in claim 4, wherein each of said first and second resilient means of the pair thereof associated with each given, said top support plate of said second type is of elongated configuration and is disposed in alignment with the respectively associated aligned pair of first and second major arms of said given top plate of said second type, said respective first and second resilient means being connected at first ends thereof to said second plate at positions adjacent the correspondingly aligned said depending extensions next adjacent the said depending extension received in said given top plate of said second type.

6. A flexible support as recited in claim 5, wherein each said resilient means comprises a leaf spring.

7. A flexible support as recited in claim 3, wherein:

each said top plate of said first type further comprises a diagonal arm segment extending across each said exterior vertex thereof and integrally interconnecting each pair of major arms associated with the respective said vertex and an inward lateral extension at an intermediate position on each said major arm, associated respectively with and displaced from each vertex defined thereby;

each said top plate of said second type further comprises a diagonal arm segment extending across each said interior vertex thereof and integrally connecting said adjacent major arms respectively associated with the respective said vertex, and transverse lateral extensions adjacent the extremity of each of said major arms, said transverse lateral extensions and said diagonal arm segment having an upper surface common with the upper surface of said major arms and being of reduced height relatively to the height of said major arms so as to define an undercut channel relatively thereto;

said top plates of said first type being assembled with said top plates of said second type in said interdigitized relationship of said first and second matrices thereof, with said lateral extensions and diagonal arm segment associated with each said exterior vertex of each said top plate of said first type being received in said undercut channel associated with the respective said mating interior vertex of a contiguous said top plate of said second type, and thereby having superposed thereon the respective said transverse lateral extensions and diagonal arm segment associated with said respective mating interior vertex of said contiguous top plate of said second type.

8. A flexible support as recited in claim 7, wherein there is further provided a vertical bore extending through each said superposed transverse lateral extension of said top plates of said second type and a corresponding, aligned bore extending partially through the corresponding lateral extension of said top plate of said first type; and an alignment pin received in each of said aligned bores of the corresponding said superposed transverse extensions of said contiguous top plates of said second type and said lateral extensions of said major arms of said top plate of said first type as received in mating relationship therewith for limiting the extent of lateral displacement therebetween.

9. A flexible support as recited in claim 8, wherein:

each of said top plates of said first type includes a vertical extension on each of said major arms thereof at a position displaced from each associated exterior vertex defined thereby so as to be disposed adjacent the ends of the adjacent major arms of a top plate of said second type defining an interior vertex in which the said associated exterior vertex is received; and for each of said mating vertices, said vertex linkage connecting position comprises a threaded bore formed in the juncture of said adjacent major arms of said top plate of said second type, and each of said adjacent major arm linkage connecting positions comprises a threaded bore formed in the corresponding said vertical extensions on said major arms of said top plate of said first type.

10. A flexible support as recited in claim 9, wherein:

said vertical extensions formed on said major arms of said top plates of said first type have a top surface lower than the top surface of said major arms of said top plates of said second type when assembled in mating relationship therewith; and there is further provided:

a groove in said transverse extensions and said diagonal arm segments of each of said top plates of said second type, the bottom of the groove lying in a common plane with the top surface of said vertical extensions when said top plates of said second type are assembled with said top plates of said first type with the respective vertices thereof in mating relationship; and each said flexible linkage is received within said grooves in said top plates of said second type which are contiguous to and assembled in mating relationship with a given said top plate of said first type.

11. A flexible support as recited in claim 1, wherein:

each said top plate of said first type is of generally square configuration and defines four exterior vertices;

each said top plate of said second type is of generally cross-shaped configuration and defines four interior vertices;

each given top plate of said first type has four top plates of said second type contiguous thereto, an interior vertex of each thereof receiving in mating relationship therein a corresponding exterior vertex of said given top plate of said first type;

each said flexible linkage is of generally square configuration, corresponding substantially to the dimensions of said top plates of said first type, and comprises four continuously connected arms in a generally square configuration, each said flexible linkage being associated with a respective, given said top plate of said first type and rigidly connecting same in a plane transverse to the axis of said assembly and flexibly connecting same in a plane parallel to the axis of said assembly to said four contiguous top plates of said second type assembled in mating relationship therewith.

12. A flexible support as recited in claim 11, wherein each of said flexible linkages is connected at the corners thereof to said connecting positions at the respective, mating interior vertices of said four contiguous top plates of said second type and is connected at intermediate positions on the respective arms thereof to respectively corresponding intermediate positions on said major arms of the respective given said top plate of said first type.

13. A flexible support as recited in claim 12, wherein:

each said connecting position comprises a threaded bore; and each said flexible linkage is connected to said connecting positions by bolts received therethrough and in the corresponding said threaded bores.

14. A flexible support as recited in claim 1, wherein:

each said top plate of said first type is of generally square configuration and defines four exterior vertices;

each said top plate of said second type is of generally cross-shaped configuration and defines four interior vertices;

each given top plate of said first type has four top plates of said second type contiguous thereto, an interior vertex of each thereof receiving in mating relationship therein a corresponding exterior vertex of said given top plate of said first type;

each said flexible linkage is of generally star-shaped configuration, corresponding substantially to the configuration and dimensions of said top plates of said second type, and comprises four continuously connected V-shaped arms defining four exterior vertices and four corresponding, interior vertices each thereof intermediate an adjacent pair of said exterior vertices, each said flexible linkage being associated with a respective, given said top plate of said second type and flexibly connecting same to each exterior vertex of a contiguous top plate of said first type received in a corresponding interior vertex of said given top plate of said second type in mating relationship therewith.

15. A flexible support as recited in claim 14, wherein each of said flexible linkages is connected at said four exterior vertices thereof to corresponding connecting positions at the ends of said major arms of said associated top plate of said second type and at each interior vertex thereof to the said exterior vertex of each said contiguous top plate of said first type received in mating relationship therewith.

16. A flexible support as recited in claim 15, wherein:
each said connecting position comprises a threaded bore; and
each said flexible linkage is connected to said connecting positions by bolts received therethrough and in the corresponding said threaded bores.

17. A support structure for the upper ends of at least first and second pluralities of rod guides of respective, at least first and second different types disposed as corresponding, at least first and second interleaved matrices thereof in parallel axial relationship within an inner barrel assembly of a pressurized water reactor vessel for receiving therein respective, at least first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly, the bottom ends thereof being affixed to said first plate and the top ends thereof being disposed adjacent said second plate, comprising:
at least first and second matrices of plural top support plates of corresponding, at least first and second different types, disposed on and connected to the respective top ends of said corresponding pluralities of rod guides of said at least first and second types;
said top support plates of said at least first and second different types having respective, mating interior and exterior vertices for assembling the respective said top support plates of said matrices thereof in interdigitated relationship with exterior vertices of one said type received in mating relationship by said interior vertices of another said type;
a plurality of extensions depending from said second plate and respectively corresponding to the plurality of top plates of at least a selected one of said at least first and second different types, said top plates of said selected at least one type having central receiving apertures therein for receiving respectively corresponding ones of said depending extensions thereby to axially align same within said inner barrel assembly; and
a plurality of resilient means respectively associated with said top plates of said at least one selected type, each said resilient means being secured to said second plate and contacting and exerting a vertically downward force on said respectively associated top plate to establish a frictional engaging force opposing lateral displacement of said plate from said axially aligned position thereof.

18. A support structure as recited in claim 17, wherein there are further provided stop pins interconnecting contiguous said top plates of said interdigitated matrices thereof for limiting the extent of relative, lateral displacement therebetween.

19. A support structure as recited in claim 18, further comprising:
a flexible linkage interconnecting a given top plate of one of said types with each contiguous top plate of said other of said types having the respective said vertices thereof in mating relationship, thereby to interconnect all of said top plates of all of said types in a concatenated relationship.

20. A pressurized water reactor system having a vessel including an inner barrel assembly within which are disposed at least first and second pluralities of rod guides of respective, at least first and second different types in corresponding, at least first and second interleaved matrices thereof and in parallel axial relationship, said first and second pluralities of rod guides receiving therein respective, at least first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly, the bottom ends thereof being affixed to said first plate and the top ends thereof being disposed adjacent said second plate, and a support structure for the upper ends of said rod guides comprising:
at least first and second matrices of plural top support plates of corresponding, at least first and second different types, disposed on and connected to the respective top ends of said corresponding pluralities of rod guides of said at least first and second types;
said top support plates of said at least first and second different types having respective, mating interior and exterior vertices for assembling the respective said top support plates of said matrices thereof in interdigitated relationship with exterior vertices of one said type received in mating relationship by said interior vertices of another said type;
a plurality of extensions depending from said second plate and respectively corresponding to the plurality of top plates of at least a selected one of said at least first and second different types, said top plates of said selected at least one type having central receiving apertures therein for receiving respectively corresponding ones of said depending extensions thereby to axially align same within said inner barrel assembly; and
a plurality of resilient means respectively associated with said top plates of said at least one selected type, each said resilient means being secured to said second plate and contacting and exerting a vertically downward force on said respectively associated top plate to establish a frictional engaging force opposing lateral displacement of said plate from said axially aligned position thereof.

21. A reactor system as recited in claim 20, wherein there are further provided stop pins interconnecting contiguous said top plates of said interdigitated matrices thereof for limiting the extent of relative, lateral displacement therebetween.

22. A reactor system structure as recited in claim 21, further comprising:
a flexible linkage interconnecting a given top plate of one of said types with each contiguous top plate of said other of said types having the respective said vertices thereof in mating relationship, thereby to interconnect all of said top plates of all of said types in a concatenated relationship.

23. A support for the top ends of a plurality of elongated rod guides of at least first and second types, generally vertically disposed within a pressurized water reactor vessel in corresponding, at least first and second interleaved matrices, said vessel having lower and upper support structures and said rod guides having lower ends fixedly supported on the lower support structure and upper ends disposed adjacent to and spaced vertically below the upper support structure, said support comprising:
plural top support plates of at least first and second types, disposed on and connected to the respective top ends of said corresponding, at least first and second types of rod guides;
said top support plates of said at least first and second types having respectively mating, exterior peripheral surfaces for assembly of each said top support plate of one said type in mating relationship with respective, contiguous and surrounding top support plates of another said type;
means resiliently interconnecting each said top support plate of said one type with each of said respective, contiguous and surrounding top support plates; and
each top support plate of at least said one type being adapted for connection to the upper support structure of a pressure vessel in which said elongated rod guides and respectively associated top support plates are disposed.

24. A support as recited in claim 23, wherein said resislient interconnecting means laterally interlock said plural top support plates in a two-dimensional, concatenated relationship and resiliently restrain relative, vertical differential displacements of the individual, interconnected said top plates and associated rod guides.

25. A support as recited in claim 24, wherein said resilient conneccting means comprises a plurality of flexible linkages respectively connected to said plurality of top supoprt plates of said one type, each said flexible linkage further being connected to each of said respective, contiguous and surrounding top support plates.

26. A support as recited in claim 23, further comprising stop means interconnecting each said top support plate of said one type with each of said respective, contiguous and surrounding top support plates for limiting loads imposed on said respective, resilient interconnecting means resulting from forces tending to laterally, relatively displace the contiguous and interconnected said top support plates.

27. A support as recited in claim 26, wherein said stop means comprise pins extending between and received in respective, aligned bores provided therefor in each said top support plate of said one type and said respective, contiguous and surrounding top support plates.

28. A support as recited as recited in claim 23, wherein:
said upper support structure of said vessel further comprises a plurality of spaced, downward extensions corresponding to and defining axes of alignment with respective said top support plates of at least a selected type; and
each of said tip support plates of said selected type includes a central receiving aperture therein for receiving a respective, downward extension in the assembled relationship of said rod guides and respective top support plates with the upper support structure of said vessel.

29. A support as recited in claim 28, wherein there is further provided:
resilient means respectively associated with each of said top support plates of said selected type, connected to and extending downwardly from said upper support structure, each said resilient means selectively contacting and exerting a vertically downward force on the respective said top support plate in asid assembled relationship, to establish a frictional, engaging force opposing lateral displacement of the respective said top support plate from sai axially aligned position thereof.

30. A support as recited in claim 29, wherein said resilient means comprise leaf springs each said leaf spring having a central aperture for receiving the respectively corresponding downward extension of said top support plate, and laterally, downwardly extending arms, each said arm engaging the top surface of a respective top support plate.

31. A support as recited in claim 30, wherein each said selected top support plate is engaged by at least two said leaf springs at positions thereon so as to maintain a symmetrical force thereon relative to the axis thereof.

32. A support as recited in claim 23, wherein:
each said top plate of each said one type comprises plural major arms defining correspon ing, exterior vertices;
each said top support plate of another said type comprises plural major arms defining corresponding, plural interior vertices and undercut channels in said major arms corresponding to said interior vertices; and
each said exterior vertex defined by an adjacent pair of major arms of each said top support plate of said one type being received in the associated said undercut channel of a corresponding interio vertex of each contiguously surrounding top support plate of said another type, for assembling the respective said top support plates of s id at least first and second type in interdigitized and interlocked relationship.

* * * * *